Sept. 2, 1969     R. C. FERGASON     3,464,194
COTTON HARVESTER

Filed July 28, 1967     3 Sheets-Sheet 1

Inventor
Rector C. Fergason
By Kenneth Chicklies
Attorney

Sept. 2, 1969     R. C. FERGASON     3,464,194
COTTON HARVESTER

Filed July 28, 1967     3 Sheets-Sheet 3

Inventor
Rector R. Fergason
By Kenneth (illegible)
Attorney

United States Patent Office 3,464,194
Patented Sept. 2, 1969

3,464,194
COTTON HARVESTER
Rector C. Fergason, Gadsden, Ala., assignor to Allis-Chalmers Manufacturing Company, Milwaukee, Wis.
Filed July 28, 1967, Ser. No. 656,811
Int. Cl. A01d 45/20
U.S. Cl. 56—47                                      8 Claims

ABSTRACT OF THE DISCLOSURE

A cotton picker spindle and stripper apparatus having a releasable thrust collar which normally moves the stripper and being releasable in the event the stripper encounters excessive resistance.

The present invention relates to drum type cotton harvesters and more particularly to improvements in rotary type cotton picking spindles and stripper bushings for the spindles.

The drum type harvester includes a plurality of continuously rotating spindles supported by and projecting from a rotary drum or cylinder. The drum is rotated on a vertical axis and is moved along a row of cotton plants while the rotating picking spindles are successively projected into plants to pick up cotton fibers from the bolls. This cotton collected on the spindles during each rotation of the drum is stripped therefrom by stripper bushings located on the spindle and rotated therewith. The stripper bushings are retained in a stripper bar carried by the drum. Each spindle is provided with slots parallel to the spindle's longitudinal axis and which slots receive complementary keys or ribs formed internally in the stripper bushing thereby providing a driving connection between bushing and spindle so that they will rotate in unison with the bushing being free to slide axially of the spindle in response to in and out movement of the stripper bar. The stripper bushing is moved in and out on the spindle by the stripper bar which is eccentrically controlled from the center of the drum. As the stripper bars and associated stripper bushings move outwardly along the spindles, cotton previously picked and wrapped around the spindles will be pushed or stripped from the ends of the spindles at a certain point in the rotation of the drum where such stripped cotton is picked up and conveyed to a storage compartment on the harvester.

The broad concept of drum type cotton pickers is well known in the art. However, the present invention contemplates an advancement in such art by providing an improved spindle stripper bushing combination in which provision is made for preventing damage to the stripper bar and related parts in the event a spindle becomes bent or damaged.

A further object of this invention is to provide an improved stripper bushing to assure that picked cotton is completely stripped or removed from the spindle.

A further object of this invention is to provide inwardly projecting radial keys on the stripper bushings which coact with the spindles to improve the stripping of the cotton and also provide a cleaning and sharpening action for the spindle.

Further features of invention will become obvious from the following description taken in connection with the accompanying drawings wherein.

Figure 1:
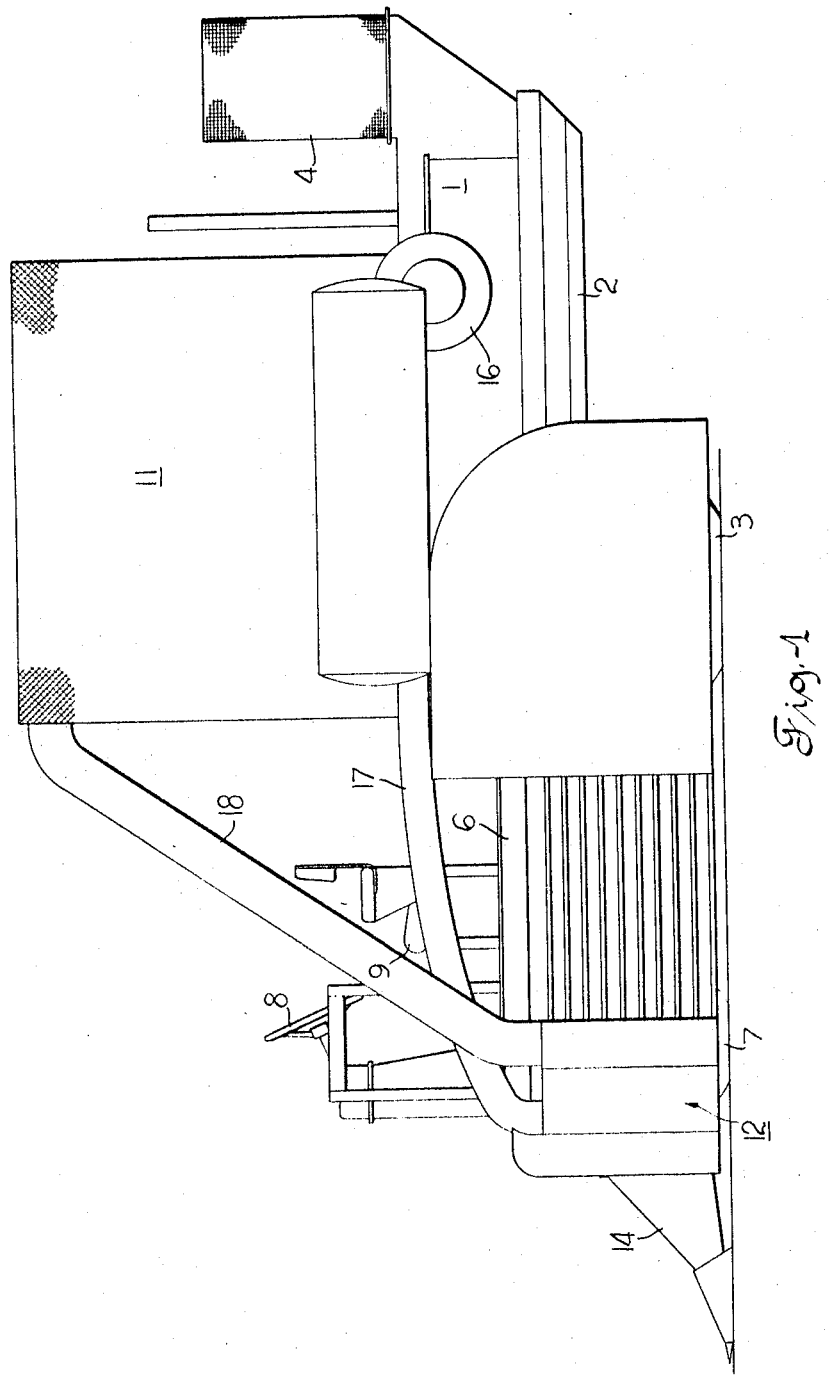
FIG. 1 is a side elevation of a cotton harvester embodying the invention.

Referring to FIG. 1, the cotton harvester embodying the invention consists generally of an engine 1 joined to an axle housing (not shown) and supported thereby as a cantilever beam. A frame member 2 supports engine 1 from the axle housing. A pair of laterally spaced traction wheels 3 (only one is shown) are operatively connected to opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of assemblies 12 (see FIG. 1) are provided with plant dividers 14 which guide cotton plants into contact with cotton pickers which are positioned just rearwardly of the plant dividers. If further details of the stalk dividers are desired, reference may be had to U.S. patent application Ser. No. 456,399, now patent 3,380,233 filed May 17, 1965 for Plant Divider for Harvesters. Frame 2 supports a blower 16 which is provided with a duct 17 which delivers pressurized air to picking assembly 12 and a cotton delivering duct 18 for depositing picked cotton into basket 11.

Figure 2:
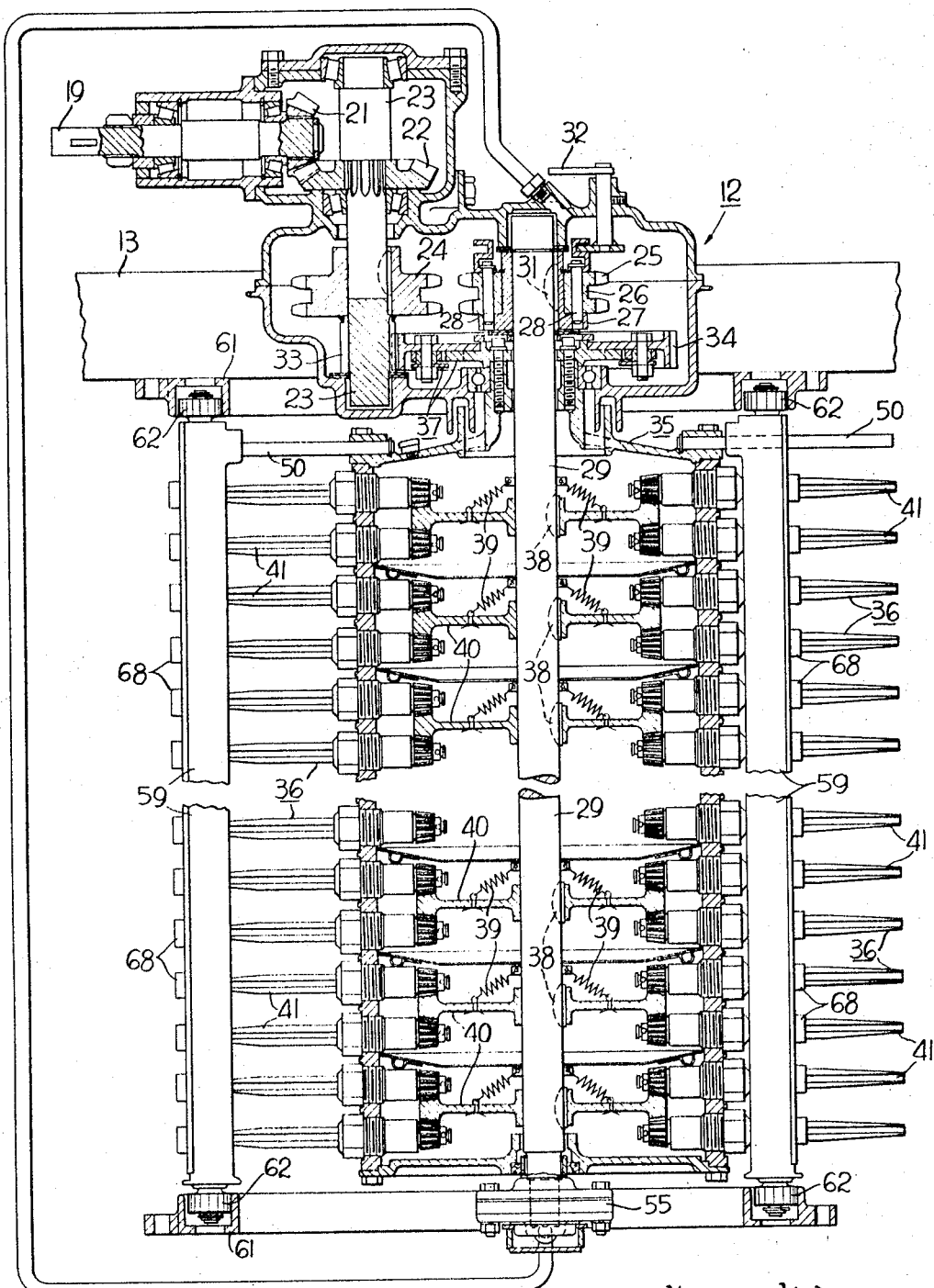
FIG. 2 is a cross sectional view of the drum type cotton harvester embodying the invention showing the power train for driving the drum and picking spindles and showing a vertical row of cotton picking spindles on the right in picking position and on the left in stripped positions.

Engine 1 is provided with a power takeoff shaft (not shown) which is operatively connected to shaft 19 of picking unit 12 (see FIG. 2). A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown) Double sprocket 25 includes a center portion 27 upon which the outer portion 26 is journaled. These two portions 26 and 27 are selectively joined together by means of pins 28. Center portion 27 is keyed to shaft 29 for rotation therewith by conventional means such as half-moon key 31. Pins 28 can be raised vertically by raising handle 32 and the mechanism connected therewith to interrupt the driving connection between portions 26 and 27.

Beneath sprocket 24 a gear 33 is attached to shaft 23. Gear 33 is drivingly engaged with a gear 34 which surrounds shaft 29 and which rotates relative thereto and gear 34 is attached to drum 35 for rotation therewith. A ratchet mechanism 37 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 36. Each picking assembly 36 includes a picking spindle 41. Pairs of horizontal rows of spindles 41 are driven by a double bevel gear 40 secured to drive shaft 29 by means of key 38. Springs 39 suspend gears 40 from shaft 29 and half-moon keys 38 permit gears 40 to be self-aligning. By not having the weight of the gears supported on the lower of the pair of spindles, backlash problems in the gears are eliminated.

The spindle assembly 36 (see FIG. 3) includes a picking spindle 41 having an inner shank portion 42 and a tapered picker portion 43. An outwardly beveled annular collar 44 is pressed on the shank portion 42 of the spindle and located adjacent the spindle picker portion 43 by means of a retaining ring 46, which ring is seated in and received by annular grooves formed in the spindle and collar. A tubular support 47 is assembled on the spindle shank portion 42 and is provided with a steel thrust washer 48 abutting the collar 44, and an oil seal 49 abutting washer 48. A pair of needle bearings 51 are positioned about shank 42 within tubular support 47. A second steel thrust washer 52 is assembled on the spindle abutting the inner end 53 of tubular support 47. A beveled pinion gear 54 is positioned on the after end of spindle 41 and drives the spindle by means of a frangible roll pin 56 with such roll pin being received in aligned openings in the spindle and gear. The outer surface of tubular support 47 is threaded as at 57 so that spindle assemblies 36 can be securely received by corresponding threaded openings in the drum 35. Radial grooves 58 in the inner end 53 of tubular support 47 provide paths for oil in the drum to enter and lubricate the needle bearings 51, and seals 49 prevent such oil from leaking adjacent the picking end of the spindle where such leakage might get on the picked cotton and result in a reduced grade. Oil for lubrication of the gears and bearings is furnished by pump 55 (see FIG. 2) which pumps oil to the upper portion of the drum and thereafter permitting same to return to the pump by action of gravity. Pump 55 is operatively connected to the lower end of shaft 29 for rotation therewith.

Figure 6:
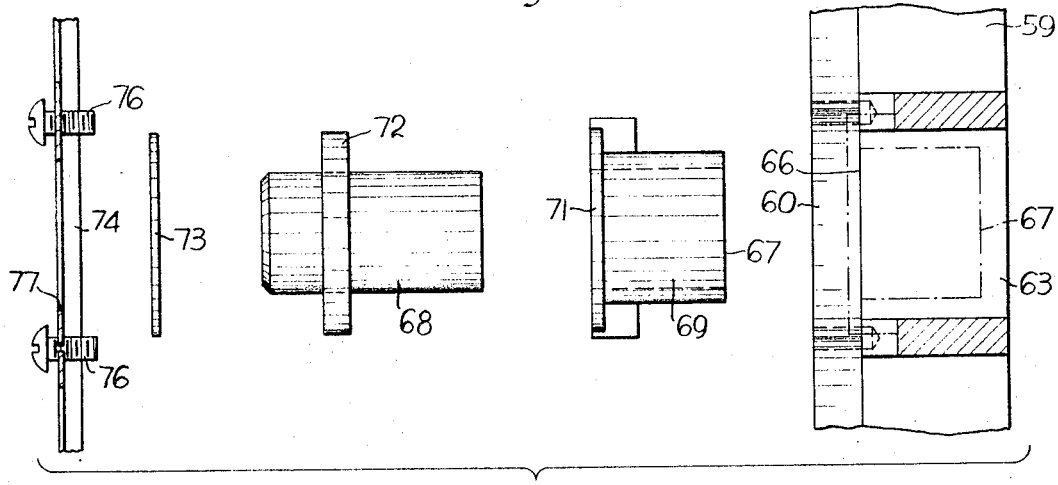
FIG. 6 is an exploded view of a portion of a stripper bar and associated parts, portions of which are shown in section.

A stripper bar 59 (FIG. 2) is associated with each vertical row of spindles on the drum 35 and is supported from the drum by means of radial rods upon which the slats are slidably mounted. A pair of vertically spaced stationary cam tracks 61 carried by means of frame 13 at the upper end and by means (not shown) at the lower end are arranged to receive rollers 62 carried by the stripper bars and to cause movement of the stripper bar longitudinally of the spindles during rotation of the drum. Each of the spindles 41 project through an opening 63 in the stripper bar (see FIG. 6) with the outer portion 60 of the opening being larger in diameter and thereby forming a shoulder 66. In each of the openings 63, a plastic sleeve bushing 67 is positioned which rotatably receives a stripper bushing 68. The sleeve bushing 67 includes a hub portion 69 and an outer end flange 71 with the inner face of said flange bearing against the shoulder 66 formed in opening 63. The stripper bushing 68 has a collar 72 pressed thereon and which collar bears against the outer face of bushing end flange 71 and against a plastic washer 73 received on the outer portion of stripper bushing 68. The plastic sleeve bushing 67, stripper bushing 68 and washer 73 are retained in stripper bar opening 63 by cover plate 74 which is secured to the outer face of stripper bar 59 by means of screw fasteners 76. The stripper bushings 68 extends outwardly through an opening 77 in the cover plate 74 with the plastic washer 73 interposed between cover plate 74 and collar 72 thereby sealing the opening against the entry of dirt, lint and the like.

Figure 4:
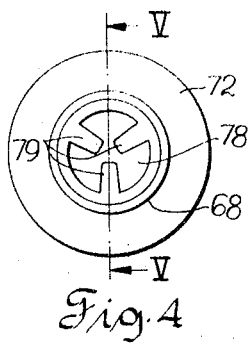
FIG. 4 is an end view of the stripper bushing and thrust collar.
Figure 5:
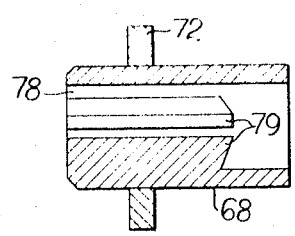
FIG. 5 is a cross sectional view taken on line V—V of FIG. 4 showing the internal keys of the stripper bushing.

The stripper bushing 68 (FIGS. 4 and 5) is provided with an opening 78 having three equally spaced tapered inwardly projecting ribs or keys 79 which are snugly received by corresponding grooves 81 (see FIG. 3) in the picking portion 82 of spindle 41. The keys 79 and complementary grooves 81 are tapered inwardly, that is the side surfaces of keys 79 and the side surfaces of grooves 81 are similarly tapered resulting in improved self-cleaning action of the keys sliding in the spindle grooves 81 as well as a sharpening action on the edges of the side surfaces forming grooves 81 through the turning of bushing 68 by the spindle 41 as the bushing slides back and forth on the spindle with a mixture of dust, moisture, cotton gum and grit results in a lap grinding effect on the active barbs 83 of the spindle to sharpen same. This self-sharpening effect is so pronounced that it is unnecessary to resharpen the picking spindles used in this embodiment.

Breakage of spindles and/or stripper bar parts have been normally caused by any damage or fouling of the spindles which would prevent relative movement between the stripper bushing and spindle primarily during outward movement of the stripper bar. In the present structure, the thrust in the stripper bushing is transmitted to the stripper bar by the bushing collar 72 abutting the sleeve bushing end flange 71. When this thrust becomes excessive due to spindle damage or the like, the frictional resistance between collar 72 and stripper bushing 68 will be exceeded causing the collar to move relative to the bushing thereby permitting movement of the stripper bar without actuating the stripper bushing. Thrust in the opposite direction is normally of a lesser magnitude and is transmitted to the stripper bar through the washer 73 and the cover plate 74. Under excess thrust in this opposite direction, the collar would again move relative to the stripper bushing 68. This frangible connection between the stripper bushing and the stripper bar protects the picking mechanism against extensive or compounded damage resulting in down time and costly repairs.

It should be noted that the stripper bushings 68 are relatively long in the nature of being approximately twice as long as their diameter and the keys 79 are longer than the diameter of the bushing 68, thereby providing a large bearing surface between the stripper bar and spindle. The cam controlled movement of the stripper bars relative to the spindles is such that the stripper bushing is slidably moved past the end of the rotating spindle to assure that all of the collected cotton is removed from the spindles. It should be further noted that when the stripper bushing is extended beyond the tip of the spindle that keys 79 are likewise beyond the spindle tip to aid in removing any cotton therefrom.

Figure 3:
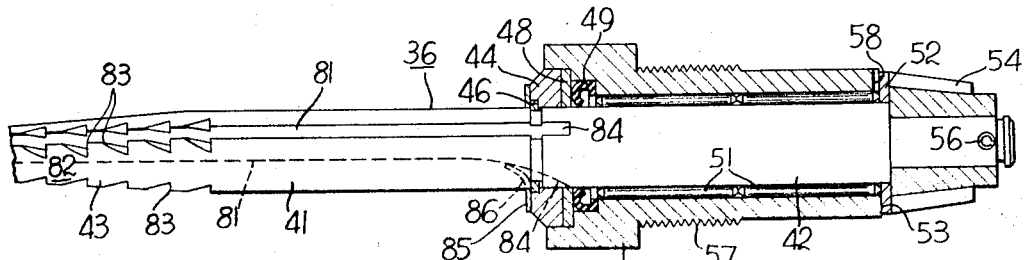
FIG. 3 is an enlarged cross sectional view of a picking spindle showing the bearings, seals, and driving pinion.

Referring to FIG. 3, it is seen that slots 81 were cut into the spindles by means of a circular shaped milling cutter which leaves a curved grooved portion 84 which extends rearwardly underlying annular collar 44. When the bushings 68 are reciprocated back and forth in the normal operation of the machine dirt and the like collecting in grooves 81 would be moved toward annular collar 44 on each return movement of bushing 68 and with no place to go, this dirt and the like would be jammed under annular collar 44. To remedy this situation, washer or dirt seal 85 has been provided. These dirt seals are inserted over the picking portion of the spindles and are provided with curved tongue portions 86 which lie in each groove 81 and when bushing 68 is reciprocated toward collar 44, each tongue portion functions as a cam track over which the dirt is moved out of the grooves to a position where the dirt can drop to the ground instead of becoming jammed into the spindle grooves.

It is obvious from the foregoing description and drawing that the detailed arrangement and construction of the various elements may be modified considerably without departing from the spirit of the invention which must not be considered as limited strictly to the construction shown and described.

The embodiments of the invention in which an exclusive property or privilege is claimed are defined as follows:

1. In a cotton picker, a picking cylinder, means for revolving the cylinder on a vertical axis, a plurality of picking spindles radiating horizontally from said cylinder, each of said spindles being journaled in said cylinder, means for rotating said spindles about their longitudinal axes, each of said spindles being provided with a picking portion extending from said cylinder and having at least one longitudinally extending groove in such picking portion, a cotton stripper bushing positioned about each spindle and including an inner portion complementary to said groove to provide a driving connection therebetween while permitting relative longitudinal movement, a thrust collar frictionally engaged with said stripper bushing, a vertical slat carried by said cylinder for rotation therewith and adapted to be moved radially during rotation of said cylinder, said stripper being positioned in said slat with said stripper being moved longitudinally by contact between said thrust collar and said slat, said thrust collar being so mounted on said stripper as to be movable relative thereto when said stripper meets a resistance to longitudinal movement on said spindle of a predetermined amount.

2. In a cotton picker as recited in claim 1 and wherein said longitudinally extending groove is provided with inwardly tapered sides and the inner portion of said stripper is complementary to said groove.

3. In a cotton picker as recited in claim 1 and wherein said stripper is rotatably supported in a bearing carried by said slat.

4. In a cotton picker as recited in claim 2 and wherein said thrust collar is positioned about the periphery of said stripper and with the side portions thereof in engagement with said slat.

5. In a cotton picker as recited in claim 4 and wherein said picking fingers are tapered and provided with three equally spaced longitudinally extending grooves and said stripper member is provided with a center portion complementary to said grooves and received therein.

6. In a cotton picker as recited in claim 5 and wherein said inner portion of said stripper extends from its outer face longitudinally inwardly a distance in excess of the diameter of said stripper.

7. In a cotton picker as recited in claim 6 and wherein said stripper is positioned in a longitudinally extending aperture in said slat and said aperture is of a diameter greater than the diameter of said stripper but less than the diameter of said thrust collar.

8. In a cotton picker as recited in claim 1 and wherein a seal member is mounted about each spindle adjacent the inboard end of said stripper bushing when said stripper bushing is in picking position, and said washer is provided with a radially extending tongue portion extending into said groove for providing a cam surface for foreign material to be ejected over from said groove by said stripper bushing.

References Cited
UNITED STATES PATENTS

| | | | |
|---|---|---|---|
| 1,742,493 | 1/1930 | Berry | 56—44 |
| 1,786,851 | 12/1930 | Johnston et al. | 56—47 |
| 1,909,646 | 5/1933 | Wirth | 56—41 |
| 2,302,180 | 11/1942 | Brown et al. | 56—44 |

RUSSELL R. KINSEY, Primary Examiner